US012115108B1

(12) United States Patent
Grant et al.

(10) Patent No.: US 12,115,108 B1
(45) Date of Patent: Oct. 15, 2024

(54) SAFETY STOP FOR WHEELCHAIR LIFT

(71) Applicants: David P. Grant, High Point, NC (US); Kris A. Bowles, Greensboro, NC (US)

(72) Inventors: David P. Grant, High Point, NC (US); Kris A. Bowles, Greensboro, NC (US)

(73) Assignee: Grants Service LLC, High Point, NC (US)

( * ) Notice: Subject to any disclaimer, the term of this patent is extended or adjusted under 35 U.S.C. 154(b) by 0 days.

(21) Appl. No.: 18/300,609

(22) Filed: Apr. 14, 2023

Related U.S. Application Data

(63) Continuation of application No. 16/688,407, filed on Nov. 19, 2019, now Pat. No. 11,628,101.

(51) Int. Cl.
*A61G 3/06* (2006.01)

(52) U.S. Cl.
CPC .................................... *A61G 3/062* (2013.01)

(58) Field of Classification Search
CPC .............................. A61G 3/062; B60P 1/4457
See application file for complete search history.

(56) References Cited

U.S. PATENT DOCUMENTS 4,474,527 A 10/1984 Risner et al.
5,261,779 A 11/1993 Goodrich
5,373,915 A 12/1994 Tremblay
2015/0305952 A1 10/2015 Nishiyama et al.
2019/0038482 A1 * 2/2019 Kline .................... A61G 3/062

OTHER PUBLICATIONS

Webpage printout from braunability.com showing "Millennium Series™ Wheelchair Lift", printed Nov. 8, 2019.

* cited by examiner

*Primary Examiner* — Saul Rodriguez
*Assistant Examiner* — Willie W Berry, Jr.
(74) *Attorney, Agent, or Firm* — Tuggle Duggins P.A.; Blake P. Hurt; Reinier R. Smit

(57) ABSTRACT

A safety device used in conjunction with a vehicle wheelchair lift, having a mounting plate for securing to the floor of a vehicle, upright members disposed on opposite longitudinal ends of the mounting plate, a barrier plate in overlying relationship to the mounting plate and pivotally connected to the uprights for movement between a raised and lowered position; the barrier plate, when raised, acting as a physical barrier to prevent a wheelchair from rolling across the mounting plate, and an actuator operatively connected to the barrier plate. In one embodiment, the upright members are a housing and a support wall. In another embodiment, the uprights are elongated members and include a cross bar disposed horizontally and in spaced parallel relation to the mounting plate when the barrier plate is raised and is disposed vertically and transverse to the mounting plate when the barrier plate is in the lowered position.

18 Claims, 6 Drawing Sheets

SAFETY STOP FOR WHEELCHAIR LIFT

This is a continuation of and claims benefits under pending prior application Ser. No. 16/688,407 filed 19 Nov. 2019, now U.S. Pat. No. 11,628,101, which is incorporated by reference in its entirety herein.

FIELD OF THE INVENTION

The disclosure herein pertains to wheelchair lifts and, more particularly, to a safety stop for use in connection with vehicle wheelchair lifts.

DESCRIPTION OF THE PRIOR ART AND OBJECTIVES OF THE INVENTION

Wheelchair lifts are well known and used in a variety of applications. For example, wheelchair lifts are used in buildings to enable persons confined to a wheelchair to access different elevations in the building. Wheelchair lifts are also widely used in vehicles used to transport physically handicapped individuals in wheelchairs.

In general, a wheelchair lift has a substantially horizontal platform designed to support the wheelchair while the chair is raised or lowered to the desired position. The platform is raised or lowered by an electric or hydraulic motor and may also include a manual operating option in the event of power loss. The two sides of the platform are typically closed off with a physical barrier of some type, such as bars or handles, while the other two ends of the platform are open to allow the wheelchair to roll onto and off of the platform. As a safety measure, a stop member is typically employed on one or both of the open ends of the platform. The stop member can be raised or lowered (i.e. displaced) to either prevent or enable the chair to enter and exit the platform and prevent the wheelchair from rolling off the platform while the lift is being operated.

Wheelchair lifts used in vehicles often comprise articulating arms to raise and lower the platform. The arms are anchored to a base plate that is secured to the vehicle. The platform is generally stored in the vehicle in a vertical orientation and, during operation, the arms will lower the platform to a horizontal position, when the wheelchair can be rolled onto the platform before being lowered to the ground. See, for example, U.S. Pat. Nos. 5,261,779 and 5,373,915, the disclosures of which are incorporated herein by reference.

When the wheelchair lift is being operated, it is desirable to prevent another wheelchair from entering the lift area. In buildings, physical barriers such as fences or gates can be employed, but when used in a vehicle, the limited space generally prevents such barriers. Accordingly most wheelchair lifts used in vehicles do not include any device that will prevent a wheelchair from entering the lift area while the platform is being raised or lowered, or while the platform is at ground level. This is an important safety issue, particularly for vehicles transporting multiple individuals in wheelchairs. In such vehicles, it is common for the passengers to be near the threshold while awaiting their turn on the lift. If the vehicle is parked on an uneven surface, the floor of the vehicle can tip toward the lift opening. Indeed, the vehicle floor can tip even when parked on a level surface when the lift is being operated because of the excess weight of the lift and rider being cantilevered away from the vehicle.

The Millennium series of lifts manufactured and sold by Braun Corporation of Winamac, IN have sensors that will activate a warning light if a wheelchair enters the threshold area when the lift platform is not ready for loading. However, the warning lights do nothing to prevent a runaway wheelchair from rolling out of the vehicle, causing injury or even death to the individual.

Accordingly, there is a need for a vehicle wheelchair lift that includes a safety feature to prevent a wheelchair from rolling out of the vehicle when the lift platform is not at the proper position. It is a primary object of the disclosure to provide such a vehicle wheelchair lift.

It is another object of the disclosure to provide a safety feature for a vehicle wheelchair lift that provides a physical barrier to block the wheels of a wheelchair from entering the lift area when the platform is not in proper position.

It is yet a further object of the disclosure to provide a safety feature for a vehicle wheelchair lift that is simple to manufacture and efficient to implement.

It is a further object of the disclosure to provide a safety feature for a vehicle wheelchair lift that deploys automatically when the platform is not in proper position and automatically retracts when the platform is properly aligned to receive a wheelchair.

These and other objects of the disclosures will become apparent upon a further reading of the detailed description with reference to the drawings and appended claims.

SUMMARY OF THE INVENTION

In accordance with a preferred embodiment, a safety stop for use in connection with a vehicle wheelchair lift comprises a base plate, a barrier plate pivotally mounted to an upright attached to the base plate, and an actuator operationally connected to the barrier plate. The actuator is preferably operationally connected to a wheelchair lift, such that the barrier plate raises automatically to block access to the lift area when the lift is not able to safely receive a wheelchair, and automatically lowers to a generally flat position once the wheelchair lift is ready to accept a wheelchair. In one or more other embodiments, the safety stop further includes a pair of uprights attached to the base plate and a transverse bar positioned across the upper end of the uprights. The transverse bar automatically raises and lowers as the wheelchair lift is operated and serves as an additional visual and physical barrier to prevent access to the lift area.

DETAILED DESCRIPTION OF THE PREFERRED EMBODIMENT AND OPERATION OF THE INVENTION

Figure 1:
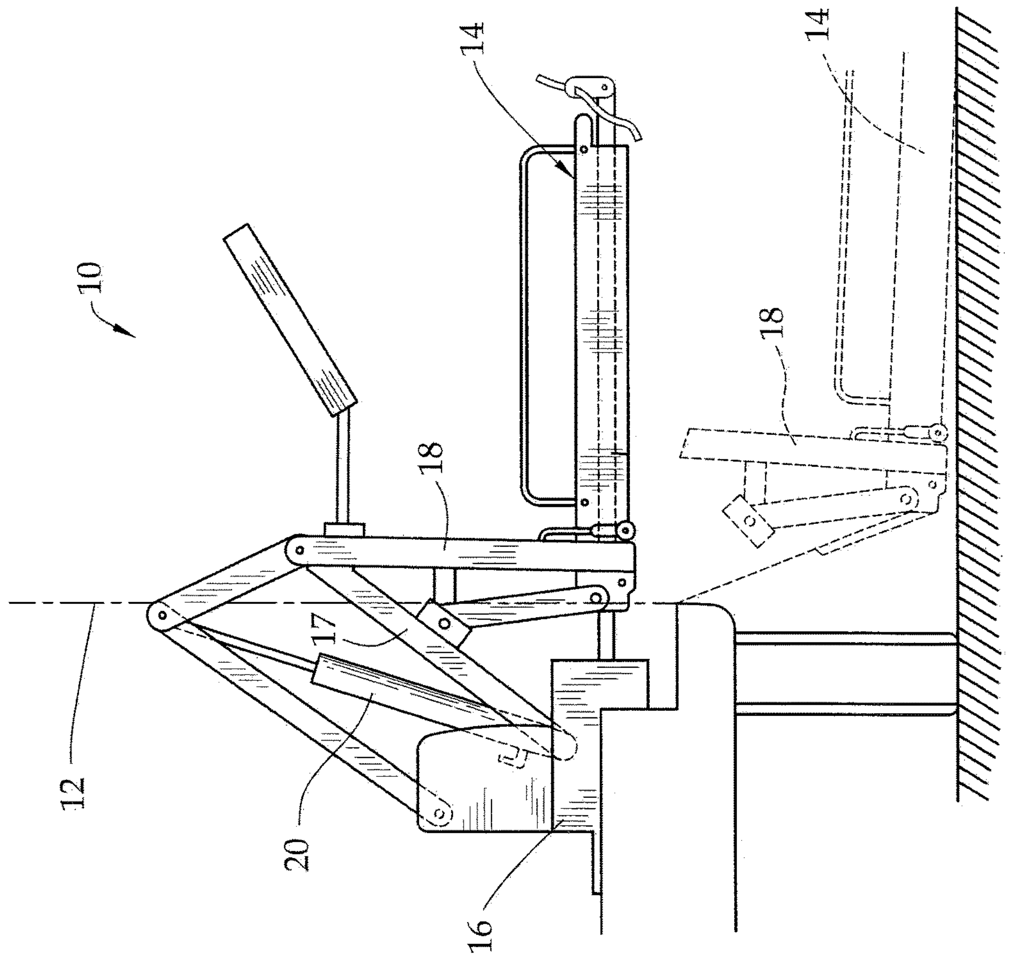
FIG. 1 (PRIOR ART)
FIG. 1 is a side elevation view, partially in phantom and partially fragmented, of a typical prior art wheelchair lift shown attached to a vehicle such as a van or bus, illustrating the lift in the raised and lowered positions.

Referring first to FIG. 1, illustrated therein is a typical vehicle wheelchair lift of the prior art. The lift 10 is shown affixed to a vehicle 12 (illustrated in broken lines), such as a van or bus. The lift 10 is configured to include an operative state and an inoperative state. When the lift 10 is in the operative state, the lift 10 comprises a platform 14 shown disposed in an elevated, horizontal position (illustrated in solid lines) and a lowered, horizontal position (illustrated in broken lines). When in the raised, horizontal position, the platform 14 is generally level with the floor of the vehicle, establishing a safe operative position so that the wheelchair can be readily and safely moved from the vehicle interior onto the platform 14. Once the wheelchair is secured, the chair is lowered to ground level and the wheelchair can be safely moved off the platform 14.

The lift 10 is secured to the vehicle 12 by way of a mounting plate 16 which is firmly affixed to the vehicle 12. The mounting plate 16 has a pair of vertical stanchions 17 (only one being shown in FIG. 1) located on the longitudinal ends of the mounting plate 16. A pair of articulating lift arms 18 (only one being shown in FIG. 1), actuated by a lift device such as ram 20, are connected to both the stanchions and the platform 14. The articulating arms 18 allow the platform to be maintained in a generally horizontal position, as shown in FIG. 1, as the platform is raised and lowered between ground level and level with the vehicle floor.

Figure 2:
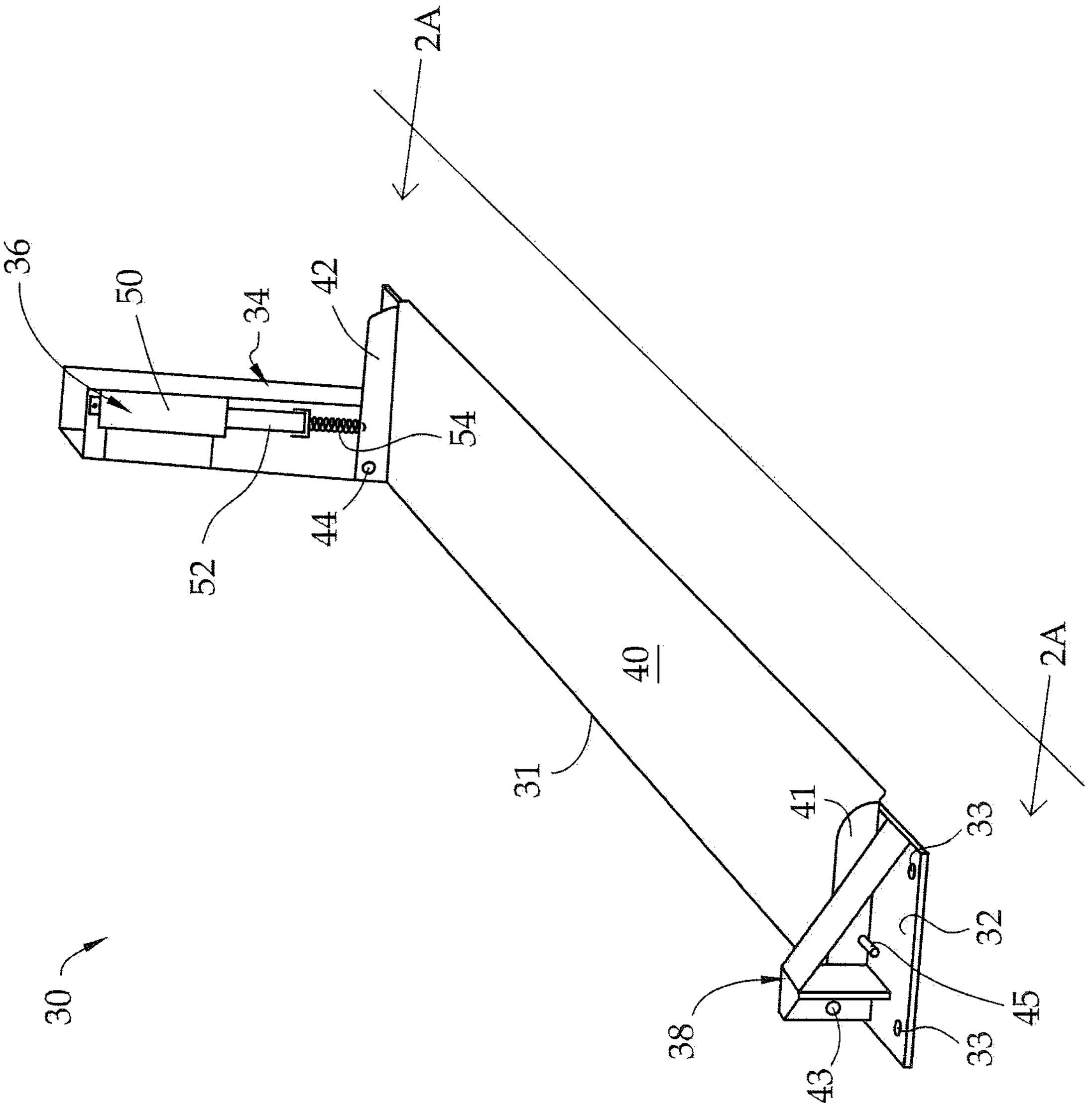
FIG. 2 is a perspective view of an embodiment of the safety stop of the disclosure, showing the barrier plate in the lowered position.
Figure 2A:
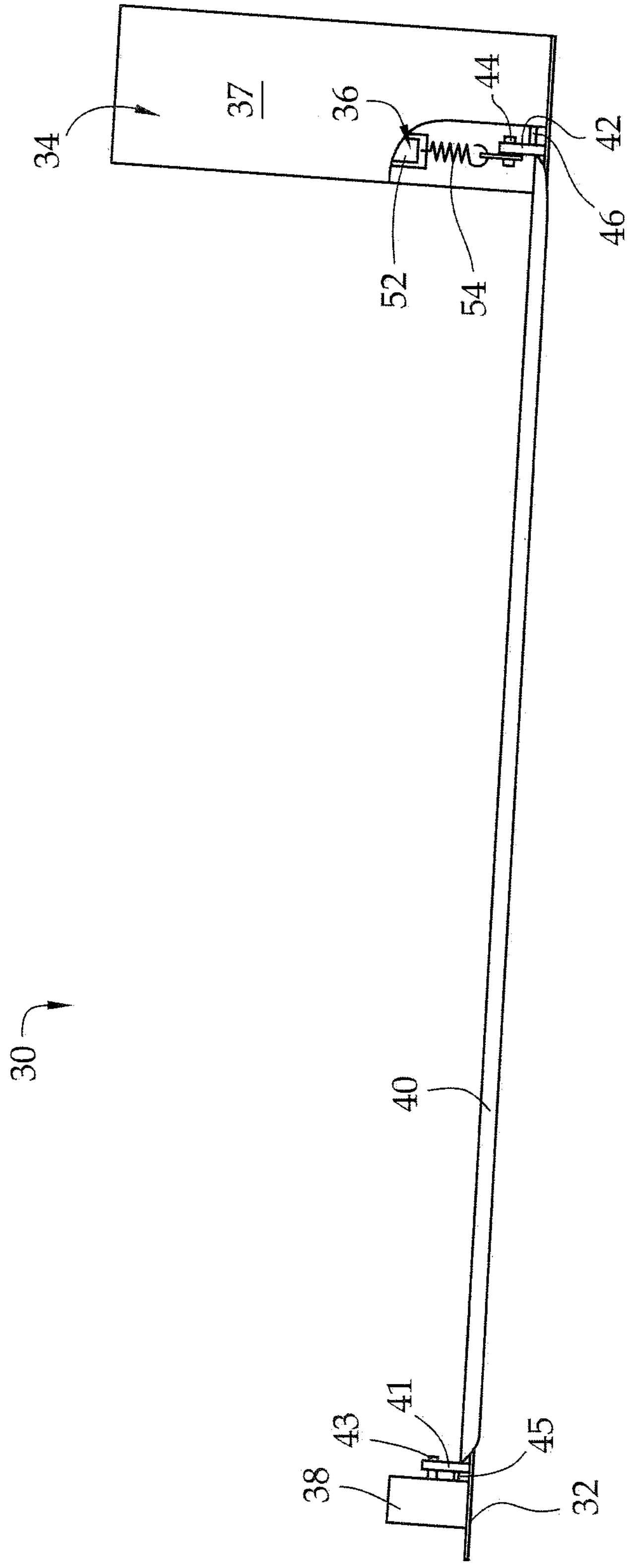
FIG. 2A is a front elevation view, as seen along lines 2A-2A of FIG. 2.
Figure 3:
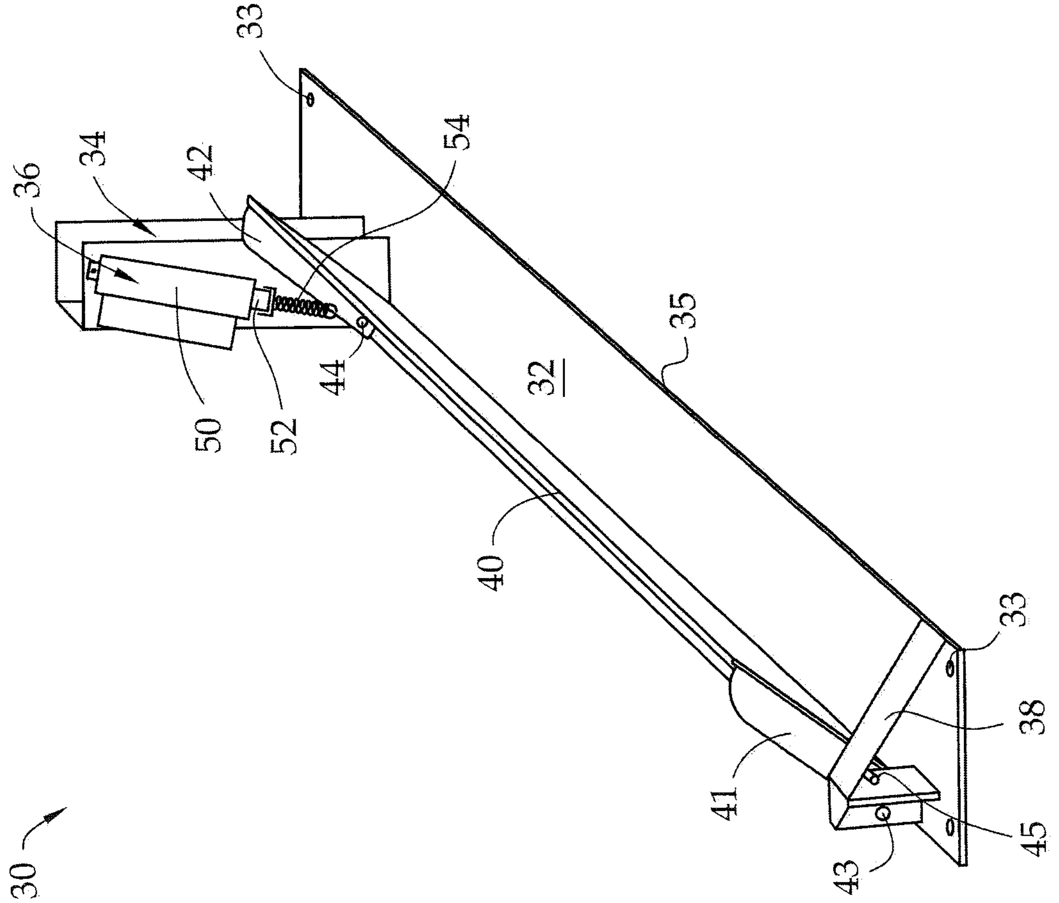
FIG. 3 is a perspective view of the safety stop of the disclosure, showing the barrier plate in a raised position.

With reference now being made to FIGS. 2, 2A and 3, one or more embodiments of the safety stop 30 of the disclosure is illustrated therein. The preferred safety stop 30 comprises a base plate 32. The base plate 32 has a plurality of mounting holes 33 to facilitate attachment of the safety stop 30 to the floor of a vehicle (not shown) by use of suitable fasteners, such as bolts, screws, rivets or the like. In use, the safety stop 30 would be positioned just inside of and adjacent to the mounting plate 16 of the vehicle lift 10 (see FIG. 1). More specifically, lateral edge 31 of safety stop 30 may be oriented toward the vehicle lift 10 and lateral edge 35 (see FIG. 3) would be oriented toward the interior of the vehicle 12.

The safety stop 30 includes an upright housing 34 at one longitudinal end thereof, which housing 34 may serve as an attachment point for actuator 36. The housing 34 preferably has a cover 37 (see FIG. 2A) but for clarity, the cover 37 is not shown in FIGS. 2 and 3. At the opposite longitudinal end of the base plate 32 is a support wall 38. A barrier plate 40 is pivotally mounted between the housing 34 and support wall 38. When lowered (i.e. substantially horizontal relative to the horizon), as seen in FIG. 2, the barrier plate 40 overlies the base plate 32 and provides a smooth transition between the interior of the vehicle 12 and the lift platform 14. When raised (i.e. substantially vertical, or substantially perpendicular relative to the horizon), as seen in FIG. 3, the barrier plate 40 forms a physical barrier to prevent a wheelchair from rolling into the threshold area of the wheelchair lift 10.

Barrier plate 40 preferably has a pair of upturned flanges 41, 42 located at opposite longitudinal ends of the barrier plate 40. Pivot pins 43, 44 connect the flanges 41, 42 to the support wall 38 and the housing 34, respectively. Barrier plate 40 is thus configured to pivot relative to the support wall 38 and housing 34 between the raised and lowered positions seen in FIGS. 2 and 3. Flanges 41, 42 may be provided with pins 45, 46, respectively, which cooperate with the support wall 38 and housing 34 to limit the upward movement of barrier plate 40.

Preferred actuator 36 is affixed to the housing 34 and includes a cylindrical member 50 and a piston 52 disposed within the cylindrical member 50 for movement between an extended and a retracted position. The piston 52 is operatively connected to the barrier plate 40, such as by coil spring 54. When the barrier plate 40 is in the lowered position seen in FIGS. 2 and 2A, the piston is in an extended position. By actuating the actuator 36, the piston 52 is drawn up into the cylinder 50 and the coil spring pulls the barrier plate 40 up into the raised position shown in FIG. 3. When the electrical signal to the actuator 36 is terminated, the piston 52 extends out of cylinder 50, and the barrier plate 40 will again move to the lowered position.

Figure 4:
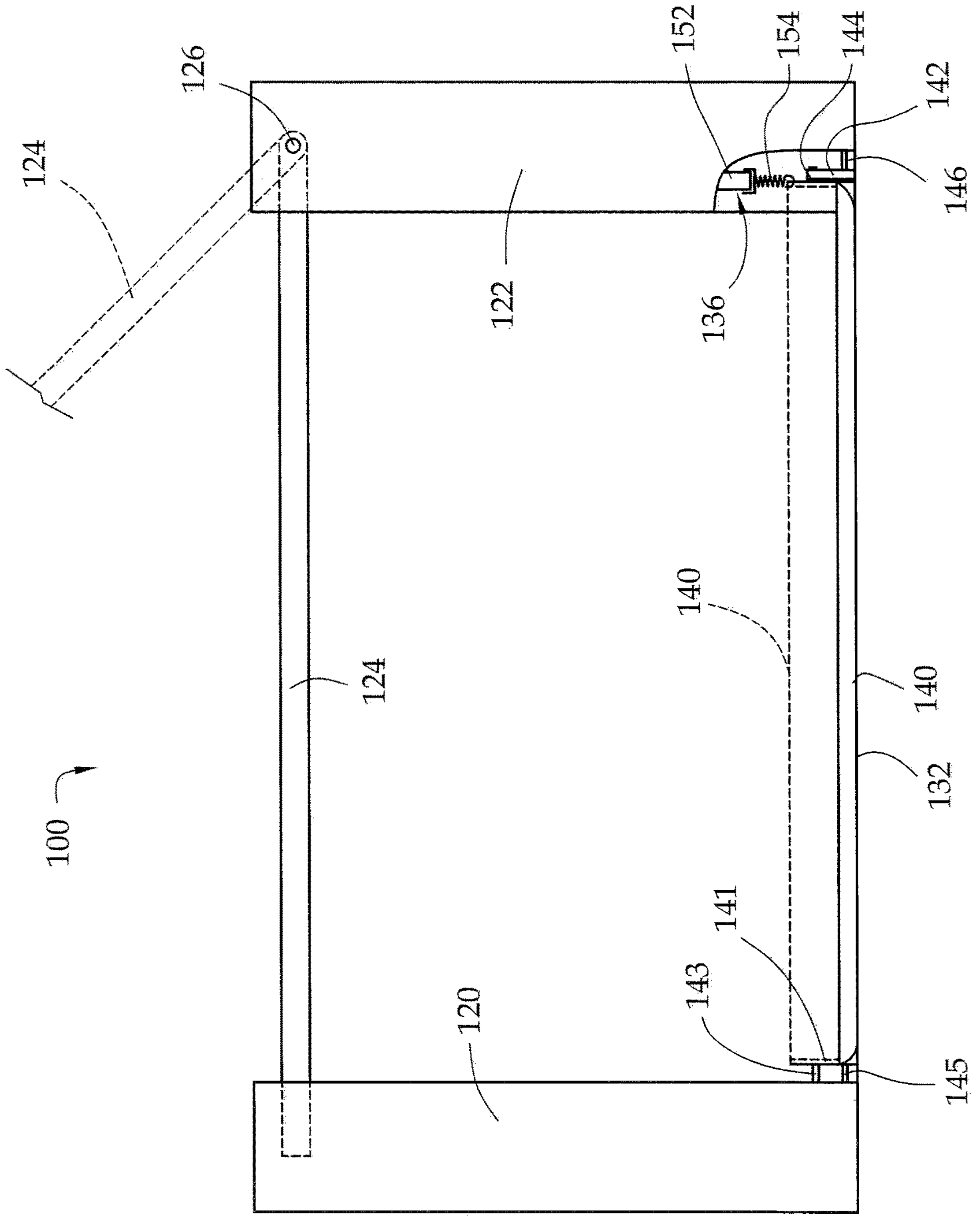
FIG. 4 is a front elevation view, partly in phantom and partly fragmented, of an alternate embodiment of the safety stop in accordance with the disclosure.

With reference now being made to FIG. 4, an alternate desirable embodiment of the safety stop device 100 is shown. In this embodiment, the safety stop 100 comprises a base plate 132, a barrier plate 140, a pair of uprights 120, 122 and a cross bar 124. The barrier plate 140 includes upwardly turned flanges 141, 142 at opposite longitudinal ends thereof. The barrier plate 140 may be pivotally mounted to the uprights 120, 122 by pivot pins 143, 144 and operated by actuator 136 as in the prior embodiment.

Cross bar 124 is preferably attached to upright 122 by shaft 126, which serves as a pivot point for cross bar 124. In this arrangement, cross bar 124 may be movable between the horizontal position shown in solid lines in FIG. 4 and the raised position shown in broken lines. Cross bar 124 preferably serves as an additional safety feature to help prevent a wheelchair from entering the lift area before the platform 14 is in the proper position. Cross bar 124 can be raised and lowered manually or it can be operatively connected to actuator 136, such that cross bar 124 is in the horizontal position when the barrier plate 140 is raised (shown in broken lines in FIG. 4) and is in the raised position when the barrier plate 140 is lowered.

Figure 5:
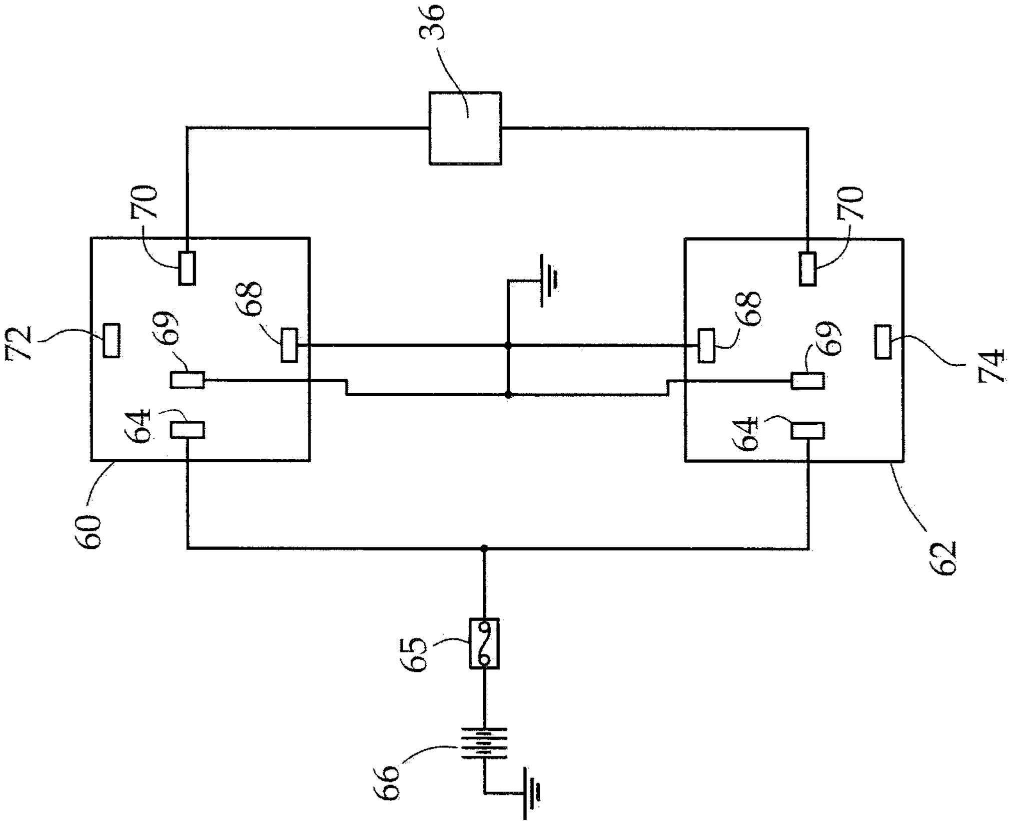
FIG. 5 is a wiring schematic for the actuator used to raise and lower the barrier plate.

FIG. 5 is a preferred schematic wiring diagram for the actuator 36. As seen in FIG. 5, a first relay 60 and second relay 62 are operatively connected to the actuator 36. Relay terminals 64 are connected to a voltage source, such as battery 66. The circuit is protected by a fuse 65. Relay terminals 68, 68 and 69, 69 are connected to ground and relay terminals 70, 70 are connected to actuator 36. Relay terminal 72 acts as the close signal and terminal 74 acts as the open signal for the circuit. Input from the open and close terminals 74, 72 will result in the raising and lowering of the barrier plate 40 and may also operate the cross bar 124.

Various substitutions or modifications to the embodiments illustrated and described may suggest themselves to those skilled in the art upon reading this disclosure. Accordingly, the illustrations and examples provided herein are for explanatory purposes and are not intended to limit the scope of the appended claims.

We claim:

1. A safety device for use in connection with a vehicle wheelchair lift, the safety device comprising: a base plate adapted for mounting to a vehicle floor; a barrier plate; and an actuator; wherein the barrier plate comprises a generally flat, planar member and defines a pair of upturned flanges on opposite longitudinal ends of the barrier plate; wherein the upturned flanges include pivot pins for pivotally mounting the barrier plate and stop pins to limit the pivotal movement of the barrier plate; wherein the actuator is operatively connected to the barrier plate to cause movement of the barrier plate from a lowered position to a raised position, such that the movement of the barrier plate is independent of movement of the vehicle wheelchair lift, and wherein when in the raised position, the barrier plate prevents the wheelchair from crossing over the safety device.

2. The safety device of claim 1, wherein the barrier plate remains in the raised position when the vehicle wheelchair lift is in any position other than the raised, horizontal position.

3. The safety device of claim 1, wherein the safety device is positioned within a vehicle on the vehicle floor and adjacent to the vehicle wheelchair lift.

4. The safety device of claim 1, wherein the barrier plate overlies the base plate when the barrier plate is in the lowered position.

5. The safety device of claim 1, wherein the barrier plate is pivotally connected to a housing and a support wall, located at opposite longitudinal ends of the base plate.

6. The safety device of claim 1, further comprising a housing and a support wall, the housing and support wall being located at opposite longitudinal ends of the base plate.

7. The safety device of claim 1, further comprising a housing and a support wall, the housing and support wall being located at opposite longitudinal ends of the base plate; wherein respective ones of the upturned flanges are pivotally connected to the housing and support wall by respective pivot pins.

8. The safety device of claim 1, wherein the actuator comprises a cylindrical member and a piston slidably received within the cylindrical member, wherein the piston is operatively connected to the barrier plate by a coil spring.

9. The safety device of claim 1, wherein the actuator comprises a cylindrical member and a piston slidably received within the cylindrical member, wherein the piston is operatively connected to one of the upturned flanges on the barrier plate by a coil spring.

10. The safety device of claim 1, further comprising a pair of uprights attached to the base plate at opposite longitudinal ends of the base plate.

11. The safety device of claim 1, further comprising a pair of uprights attached to the base plate at opposite longitudinal ends of the base plate and a cross bar, the cross bar being pivotally connected to one of the uprights.

12. The safety device of claim 1, further comprising a pair of uprights attached to the base plate at opposite longitudinal ends of the base plate and a cross bar, the cross bar being pivotally connected to one of the uprights for pivotal movement between a closed position and an open position; wherein, when in the closed position, the cross bar is disposed horizontally and in spaced parallel relation to the base plate.

13. The safety device of claim 1, further comprising a pair of uprights attached to the base plate at opposite longitudinal ends of the base plate and a cross bar, the cross bar being pivotally connected to one of the uprights for pivotal movement between a closed position and an open position; wherein, when in the closed position, the cross bar is disposed horizontally and in spaced parallel relation to the base plate and when in the open position, the cross bar is disposed vertically and perpendicular to the base plate.

14. The safety device of claim 1, further comprising a pair of uprights attached to the base plate at opposite longitudinal ends of the base plate.

15. The safety device of claim 1, further comprising a pair of uprights attached to the base plate at opposite longitudinal ends of the base plate; wherein respective ones of the upturned flanges are pivotally connected to a respective one of the uprights by respective pivot pins.

16. The safety device of claim 1, further comprising a pair of uprights attached to the base plate at opposite longitudinal ends of the base plate and a cross bar, the cross bar being pivotally connected to one of the uprights for pivotal movement between a closed position and an open position; wherein, when in the closed position, the cross bar is disposed horizontally and in spaced parallel relation to the base plate and when in the open position, the cross bar is disposed vertically and perpendicular to the base plate; wherein respective ones of the upturned flanges are pivotally connected to a respective one of the uprights by respective pivot pins.

17. The safety device of claim 1, further comprising a pair of uprights attached to the base plate at opposite longitudinal ends of the base plate and a cross bar, the cross bar being pivotally connected to one of the uprights for pivotal movement between a closed position and an open position; wherein, when in the closed position, the cross bar is disposed horizontally and in spaced parallel relation to the base plate and when in the open position, the cross bar is disposed vertically and perpendicular to the base plate; and wherein the actuator comprises a cylindrical member and a piston slidably received within the cylindrical member, wherein the piston is operatively connected to the barrier plate by a coil spring.

18. The safety device of claim 1, further comprising a pair of uprights attached to the base plate at opposite longitudinal ends of the base plate; wherein respective ones of the upturned flanges are pivotally connected to a respective one of the uprights by respective pivot pins; and wherein the actuator comprises a cylindrical member and a piston slidably received within the cylindrical member, wherein the piston is operatively connected to the barrier plate by a coil spring.

* * * * *